(No Model.) 2 Sheets—Sheet 1.
J. A. MENGEL.
SEED PLANTER.

No. 539,069. Patented May 14, 1895.

Witnesses
G. A. Tauberschmidt,
W. Parker Reinohl.

Inventor
Joseph A. Mengel,
By D. L. Reinohl
Attorney (No Model.) 2 Sheets—Sheet 2.
J. A. MENGEL.
SEED PLANTER.
No. 539,069. Patented May 14, 1895.
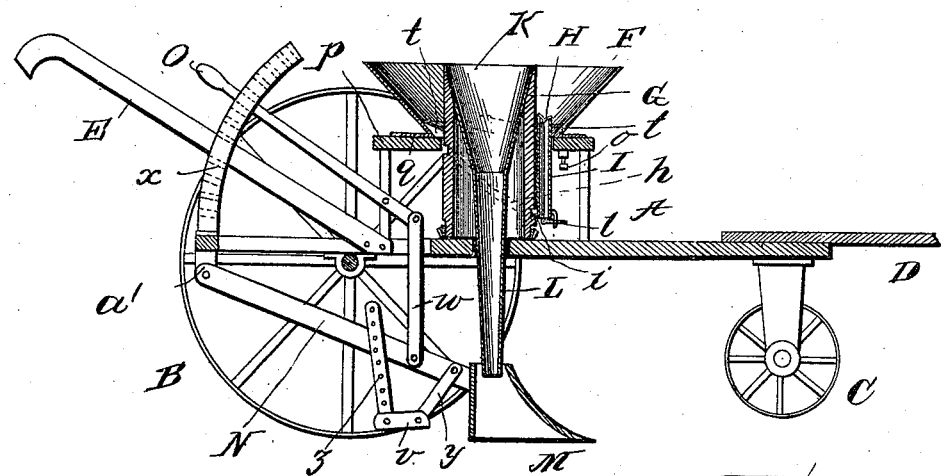
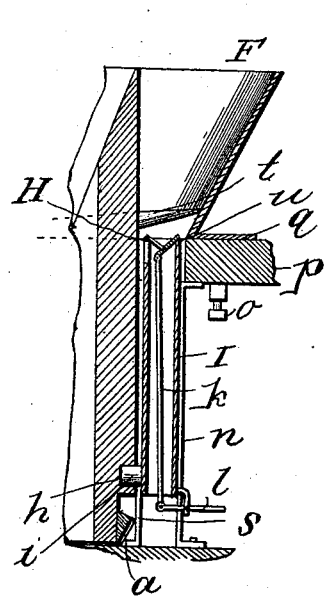
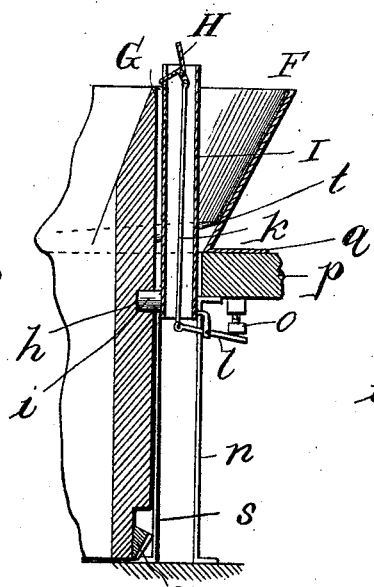
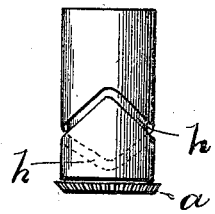
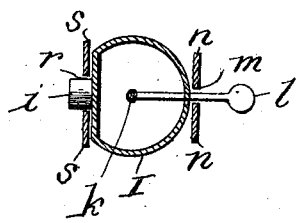
Witnesses
G. A. Faubenschmidt,
N. Parker Reinohl.
Inventor
Joseph A. Mengel
By D. C. Reinohl
Attorney
THE NORRIS PETERS CO., PHOTO-LITHO., WASHINGTON, D. C.

UNITED STATES PATENT OFFICE.

JOSEPH A. MENGEL, OF McKEANSBURG, PENNSYLVANIA.

SEED-PLANTER.

SPECIFICATION forming part of Letters Patent No. 539,069, dated May 14, 1895.

Application filed August 27, 1894. Serial No. 521,438. (No model.)

*To all whom it may concern:*

Be it known that I, JOSEPH A. MENGEL, a citizen of the United States, residing at McKeansburg, in the county of Schuylkill and State of Pennsylvania, have invented certain new and useful Improvements in Seed-Planters; and I do hereby declare the following to be a full, clear, and exact description of the invention, such as will enable others skilled in the art to which it appertains to make and use the same.

My present invention relates to agricultural implements, and has especial reference to that class of implements known as seed-planters which are used for planting potatoes, and has for its object certain improvements in construction which will be fully disclosed in the following specification and claims.

One of the greatest difficulties attending this class of machines lies in getting the feed to operate regularly. In its present form the feed frequently supplies more than one potato where only one is required, or it sometimes fails to supply the required one. This is due partly to the fact that the potatoes lie static in the hopper and do not gravitate to the feed cup. It is my purpose to agitate the potatoes in the hopper and thereby not only cause the potatoes to gravitate to the feed cup, but to cause the agitator to prevent the seed cup delivering more than one potato to the seed cup at any given time.

Figure 1:
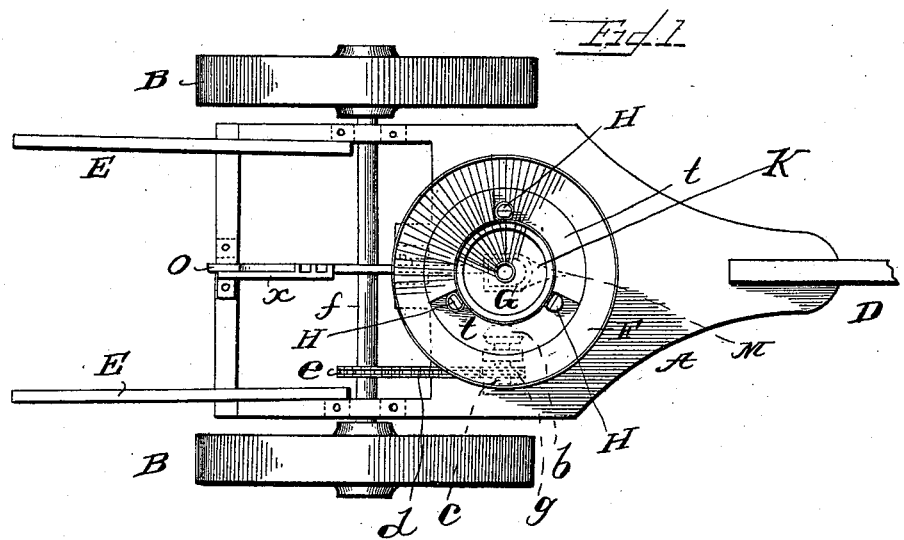
Figure 2:
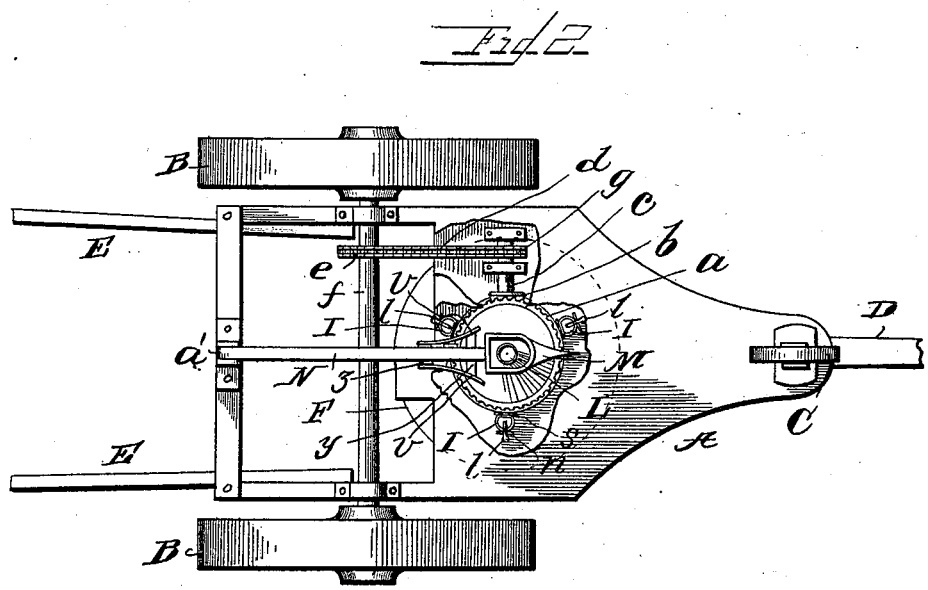

In the accompanying drawings, which form part of this specification, Figure 1 represents a top plan view of my improved seed-planter; Fig. 2, an inverted plan of the same; Fig. 3, a vertical longitudinal section; Fig. 4, an enlarged sectional detail of the feed mechanism with the seed-cup at the lower end of its stroke; Fig. 5, a like view with the seed-cup at the upper end of its stroke; Fig. 5ª, a side elevation of the revoluble cylinder detached and on a reduced scale; Fig. 6, a transverse section, on an enlarged scale, of one of the seed-cup cylinders; and Fig. 7, a top plan view of the chutes in the hopper.

Reference being had to the drawings and the letters thereon, A indicates the frame of the planter, B. B. the side wheels, and C the front wheel.

To the front end of the frame is attached the usual pole D, and at the rear end are the handles E. E. for guiding the planter.

F indicates an annular hopper within which is a revoluble cylinder G provided at its lower end with a gear wheel $a$ which is engaged by a pinion $b$ on shaft $c$ and is operated by a chain $d$ which engages a wheel $e$ on the axle $f$ and a wheel $g$ on the shaft $c$ to revolve the cylinder. On the outer surface of the cylinder G is a double cam-groove $h$, that is to say, a groove extending from the bottom of the cylinder upward on both sides of its vertical center, and around the cylinder are disposed the seed-cups H which are pivotally supported in the upper ends of the vertically reciprocating cylinders I which are operated by the cam-groove $h$ by a stud $i$ on the lower end of each cylinder engaging the groove, and as the cylinder G revolves the cylinders I are reciprocated and the seed from the hopper F raised and deposited into the seed receptacle K within the cylinders I, from which it passes through the conductor L to the furrows made by the plow M.

To the seed-cups H is attached a rod $k$ which extends down to the lower end of the cylinders I and is provided with a right angled lever $l$ which operates in a slot $m$ formed by the bars $n\ n$ and is tripped to discharge the seed when the cylinders I have reached the upper edge of the cylinder G by contact with an adjustable bolt $o$ on the under side of the base $p$ on which the hopper F rests. The hopper is provided with a flange $q$ by which it is removably attached to the base $p$. The studs $i$ on the cylinders I work in slots $r$ between bars $s\ s$ and guide the cylinder in its reciprocations.

Within and at the bottom of the hopper F are chutes $t$ inclined inward toward the cylinder G, and circumferentially toward the opening $m$ in the bottom of the hopper through which the cylinders I reciprocate. These chutes direct the seed toward the openings $m$ as the seed is agitated by the revolving of the cylinder G and gravitates toward the bottom of the hopper and thereby provides an unfailing supply of seed to the cups H. Should the cups take up more than one potato at a time the frictional contact of the cylinder G in its revolutions with the potatoes will dislodge one of the potatoes before the seed-cup reaches the upper end of the cylinder G and deposits its charge into the seed receptacle K.

The plow M is attached to a beam N which is also provided with furrow closers *v v* and the beam is adjustable vertically to regulate the depth of the furrows by means of a lever O and link *w* and the lever is secured in a rack *x* on the frame of the planter. The furrow closers are attached to the plow beam by links *y* and *z*, the latter being adjustable on the beam to regulate the quantity of soil that is distributed over the seed in the furrows.

The plow beam is pivotally attached at its rear end to the under side of the frame of the planter at *a'*.

Any suitable means may be provided for varying the intervals at which the seed shall be dropped, as is common in this class of implements.

Having thus fully described my invention, what I claim is—

1. In a seed planter, a receptacle for holding seed in combination with a revoluble cylinder, reciprocating seed conveying cylinders and a seed conducting tube.

2. In a seed planter, a receptacle for holding seed, a revoluble cylinder having a cam groove in its outer surface, and reciprocating seed conveying cylinders operated by said cylinder, and a seed conducting tube.

3. In a seed planter, a receptacle for holding seed, in combination with a revoluble cylinder, reciprocating seed conveying cylinders operated by the revoluble cylinder, pivoted seed-cups in the end of the reciprocating cylinders, and a seed conducting tube.

4. In a seed planter an annular hopper, a revoluble cylinder concentric to said hopper and reciprocating seed conveyers, in combination with means for operating said cylinders from the axle of the planter.

In testimony whereof I affix my signature in presence of two witnesses.

JOSEPH A. MENGEL.

Witnesses:
AUGUST KNECHT,
ROBERT KNECHT.